(12) United States Patent  
Casey

(10) Patent No.: US 7,377,440 B2  
(45) Date of Patent: May 27, 2008

(54) MEDIA SERVICES MANAGER FOR BASE STATION

(75) Inventor: Steven M. Casey, Littleton, CO (US)

(73) Assignee: Qwest Communications International Inc., Denver, CO (US)

( * ) Notice: Subject to any disclaimer, the term of this patent is extended or adjusted under 35 U.S.C. 154(b) by 527 days.

(21) Appl. No.: 11/060,633

(22) Filed: Feb. 16, 2005

(65) Prior Publication Data

US 2006/0180668 A1    Aug. 17, 2006

(51) Int. Cl.
*G06K 7/10* (2006.01)
(52) U.S. Cl. .................. 235/472.01; 235/454
(58) Field of Classification Search ........... 235/472.01, 235/454, 472.02, 472.03, 462.45, 462.46, 235/462.47
See application file for complete search history.

(56) References Cited

U.S. PATENT DOCUMENTS

| 5,887,243 | A  | * | 3/1999 | Harvey et al. .............. 725/136 |
| 6,256,691 | B1 |   | 7/2001 | Moroz et al. |
| 6,741,684 | B2 |   | 5/2004 | Kaars |
| 7,016,643 | B1 | * | 3/2006 | Kuether et al. ............ 455/3.02 |

FOREIGN PATENT DOCUMENTS

EP          793164 A2    9/1997

OTHER PUBLICATIONS

*Television is coming to a cell phone near you*, http://pd.pennnet.com/Articles/Article_Display.cfm?Section=Articles&Subsection=Display&ARTICLE_ID; dated Jul. 20, 2004, 4 pages.

*Sony Portable TV & MPEG4 recorder*, http://www.icube.us/sony_msv-al/product_overview.htm, dated Jul. 20, 2004, 1 page.

dynamism.com, *Sony MSV-A1-Portable TV*, http://www.dynamism.com/msv-al/, dated Jul. 20, 2004, 1 page.

XVision Systems, Play and Convert your media files; mp3, wav, asf, avi, mpg and more . . . *About MPG, MPEG-4*, http://www.xvonline.com/xfiles/about_mpg.htm, dated Oct. 28, 2004, 2 pages.

* cited by examiner

*Primary Examiner*—Karl D. Frech
(74) *Attorney, Agent, or Firm*—Townsend and Townsend and Crew LLP

(57) ABSTRACT

Various embodiments of the invention provide methods and systems for managing the reception and/or recording of media content on a base station. In certain embodiments, the base station is configured to transfer media content received by the base station to a portable media device. In one aspect, the portable media device may be a wireless phone with media playback capabilities. One set of embodiments provides a reception manager for managing the reception of media content by the base station. Merely by way of example, embodiments of the present invention may provide for monitoring of the signal strength of broadcast media content, and certain embodiments may provide for receiving and displaying information concerning media content available to the base station. Other embodiments of the present invention may provide for the management of recording and/or storing of media content. Merely by way of example, in some embodiments, a storage processor may determine what media content to record and/or may associate priority values to media content.

68 Claims, 4 Drawing Sheets

MEDIA SERVICES MANAGER FOR BASE STATION

CROSS-REFERENCE TO RELATED APPLICATIONS

This application is related to U.S. application Ser. No. 11/060,222, filed Feb. 16, 2005 by Steven M. Casey and entitled "Mobile Device Base Station for Enhanced Signal Strength for Media Services", the disclosure of which is incorporated herein by reference for all purposes. This application is also related to U.S. application Ser. No. 11/060,224, filed Feb. 16, 2005 by Steven M. Casey and entitled "Wireless Digital Video Recorder", the disclosure of which is incorporated herein by reference for all purposes. This application is further related to U.S. application Ser. No. 11/060,219, filed Feb. 16, 2005 by Steven M. Casey and entitled "Wireless Digital Video Recorder Manager", the disclosure of which is incorporated herein by reference for all purposes.

BACKGROUND OF THE INVENTION

The present invention relates generally to the field of media docking stations. More specifically, embodiments of the present invention provide methods and systems for effectively gathering and managing media content at a docking station at enhanced signal strengths for use in a portable media device.

In recent years, with advances in media technology, in particular the developments in digital electronics, more and more mobile media devices are being produced. Consequently, it is more and more likely that media will increasingly be viewed on devices other than personal computers. These new media devices will be either new products, such as email readers and Internet radios, or existing products such as MP3 players and personal digital assistants ("PDAs"), with new features. Generally, the new media devices will be able to access the Internet and most of the devices will be portable, operating either within a wireless home network, or using wireless networks similar to the current wireless phone network. The success of all of the new portable media devices will depend upon the ability to provide desirable media content to the media user that is economical, interesting and of a quality so that the user does not use a less mobile media device, such as a standard personal computer, to access the content.

Mobile media devices have been in the mainstream marketplace for quite a while. For example, hand-held gaming devices have become commonplace ever since the introduction of the original Nintendo Gameboy in the 1980's. More recently, peripherals have been added to handheld gaming devices including: television receivers, multi-player capabilities, external keyboards, larger power supplies, and modems. As well as gaming devices, PDAs have become more commonplace and more complex, mobile televisions have become smaller with better performance and portable email devices have changed business communications.

However, the device that is most likely to become the platform for a mobile media device is the wireless phone. Wireless phones currently offer email, instant messaging and downloadable media, such as graphics, MIDI files and audio files. Today, there are more than 169 million wireless phone subscribers in the United States. In previous years, industry experts have predicted that wireless phone sales were close to or had reached a saturation point. However, in recent years, a multitude of new features have been added to the basic wireless phone design to entice consumers to make new wireless phone purchases and sign-up for wireless provider plans. Therefore, today wireless phones that provide internet access or contain cameras make up a significant and growing percentage of the overall wireless phone market. Last year about 9 million camera equipped wireless phones were sold in the United States. And this year it is expected that another 28 million camera equipped wireless phones will be sold. Additionally, worldwide 60 million camera wireless phones were sold last year and more than 100 million are expected to be sold this year Today consumers expect more features on their wireless phones. These features may be for convenience, such as electronic address books and calendars, or leisure, such as electronic games and cameras. It is predicted that the next generation of wireless phones will be a combination of phones, PDAs, digital cameras and handheld gaming devices. In fact, thanks to the digital revolution the feature set of wireless phones has increased to include extras such as games, music players, and text messaging. Future wireless phones might not look radically different from existing wireless phones, but what they will enable users to do will change significantly. It is expected that future wireless phones will include the following features: high-speed data access, Wi-Fi functionality, and high-quality video cameras. Additionally, the ability to store files and documents will mean that the wireless phone may essentially become a desktop computer.

With the recent developments in portable/handheld media devices there now exists in the marketplace a need for effectively providing the new portable media devices with media content. Currently, media content is provided to a user by playing the content back from a memory card on which it is stored. The memory cards storing the media content may be purchased with the content already stored or a wireless phone and/or portable media device user may use their personal computer and/or other recording device to record content to the memory card. These methods of obtaining media content, however, either limit the wireless phone user to the media content that is available on pre-recorded memory cards or requires the user to have the knowledge and accessories to record media content to a memory card.

As described in the co-pending applications, a mobile media device may be adapted to directly receive media content through television tuners, satellite radio receivers, and the like. However, with mobile type devices, the reception of media content may be compromised by the mobility of the mobile media device due to, among other things, signal reception. Additionally, power usage and the ability of the device to contemporaneously receive and manage video content from multiple sources are problems existing in the art. Further, multiple sources of media content exist that a user of a portable media device must connect to and access to download media content.

Consequently, there exists in the art a need for methods and systems for users of portable media devices to derive media content for their portable media devices that address power, signal strength, and media managing issues. It would be advantageous to provide a device for generating media content for mobile media devices that provides for the enhancement of the method of receiving/capturing the media content so that the mobile media device may be provided with high quality media content. Further, it would be desirable to provide user-friendly methods and systems for capturing and managing media content for use on available mobile media devices.

BRIEF SUMMARY OF THE INVENTION

Embodiments of the present invention solve at least the problems discussed above by providing a base station system and method for use with a portable media device. Offering several applications in the technical arts, embodiments of the present invention provide a method and a system for receiving and/or managing media content at a base station for use in a portable media device.

Some embodiments of the present invention relate to systems and methods for receiving, storing and/or managing media content for use on wireless phones with media capabilities. In certain embodiment of the present invention, a base station capable of receiving, storing and/or managing media content is disclosed. In some embodiments of the present invention, the base station may be operable to receive broadcast media content and transfer the received broadcast media content to a portable media device. The portable media device may be a device capable of playing the media content transferred from the base station to a user of the portable media device. In certain aspects, the portable media device may be a wireless phone with the capability of playing media content. In certain aspects of the present invention, the wireless phone with media capabilities may be powered while docking with the base station.

The base station may be connected with media content sources in many different ways to provide for a wide variety of media content and for the optimization of the related media content delivery. Further, the base station may be equipped with a plurality of receiving interfaces providing for reception of broadcast media content in different formats. In some embodiments, the base station may be equipped with a tuner to provide for tuning of the broadcast media content. In certain embodiments of the present invention, a docking port, media content transfer port, etc. may be provided to transfer media content received by the base station to the portable media device. In further embodiments, the base station may comprise a recorder for recording the media content received by the base station. In certain aspects, the media content may be recorded to a hard-drive, flash memory, etc. associated with the base station. In other aspects, the media content may be recorded to a memory card, or the like. In some embodiments, recorded media content may be transferred to the portable media device. In some aspects, transfer of media content may be the transfer of a memory card. In some embodiments, the base station may provide for processing the media content received by the base station. In some aspects processing may involve formatting the media content for display on the portable media device. In other aspects, processing may involve digitizing the media content. In further aspects, processing may comprise compressing the media content.

In various embodiments of the present invention, a user interface may provide means for a user to select media content to receive and store at the base station. In certain aspects of the present invention, a user interface may be used to input settings for entering rules for the selection, receiving and/or storage of media content. In certain embodiments of the present invention, the user interface may have a web-based component and/or support a browser or multiple browsers. In further embodiments, the user may be able to interface with the base station through a personal computer, wherein such interfacing may be via the Internet and/or some other network and/or connection between the personal computer and the base station, such as a wireless or hard-wire connection.

In some embodiments of the present invention, a processor, software application and/or the like may manage the reception of media content. In certain aspects, management of the reception of media content may include identifying media content available to the base station, selecting a receiver/input to receive media content, monitoring the signal strength of received media content, and the like. In certain embodiments of the present invention, a processor, software application and/or the like may manage the storage of media content. In many embodiments of the present invention, media content may be stored on the base station. In further embodiments, media content may be transferred to the portable media device. Management of the storage of media content may involve selecting media content for storage based upon a user's preferences, associating a priority value with media content selected for storing, erasing stored media content to make room for preferred media content, and the like. In certain aspects, a user may enter rules into the base station and the storage processor may select media content for storage and/or associate a preference value to the media content based upon the rules. In other aspects, the storage processor may determine what media content to store and/or what value to associate with media content based upon past habits of the user.

The foregoing, together with other features, embodiments, and advantages of the present invention, will become more apparent when referring to the following specification, claims, and accompanying drawings. Further features and advantages of the present invention, as well as the structure and operation of various embodiments of the present invention, are described in detail below with respect to the accompanying drawings.

BRIEF DESCRIPTION OF THE DRAWINGS

In the figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

The present invention will become more fully understood from the detailed description and the accompanying drawings, wherein.

DETAILED DESCRIPTION OF THE INVENTION

In the following description, for the purposes of explanation, specific details are set forth in order to provide a thorough understanding of the invention. However, it will be apparent that the invention may be practiced without these specific details.

Figure 1:
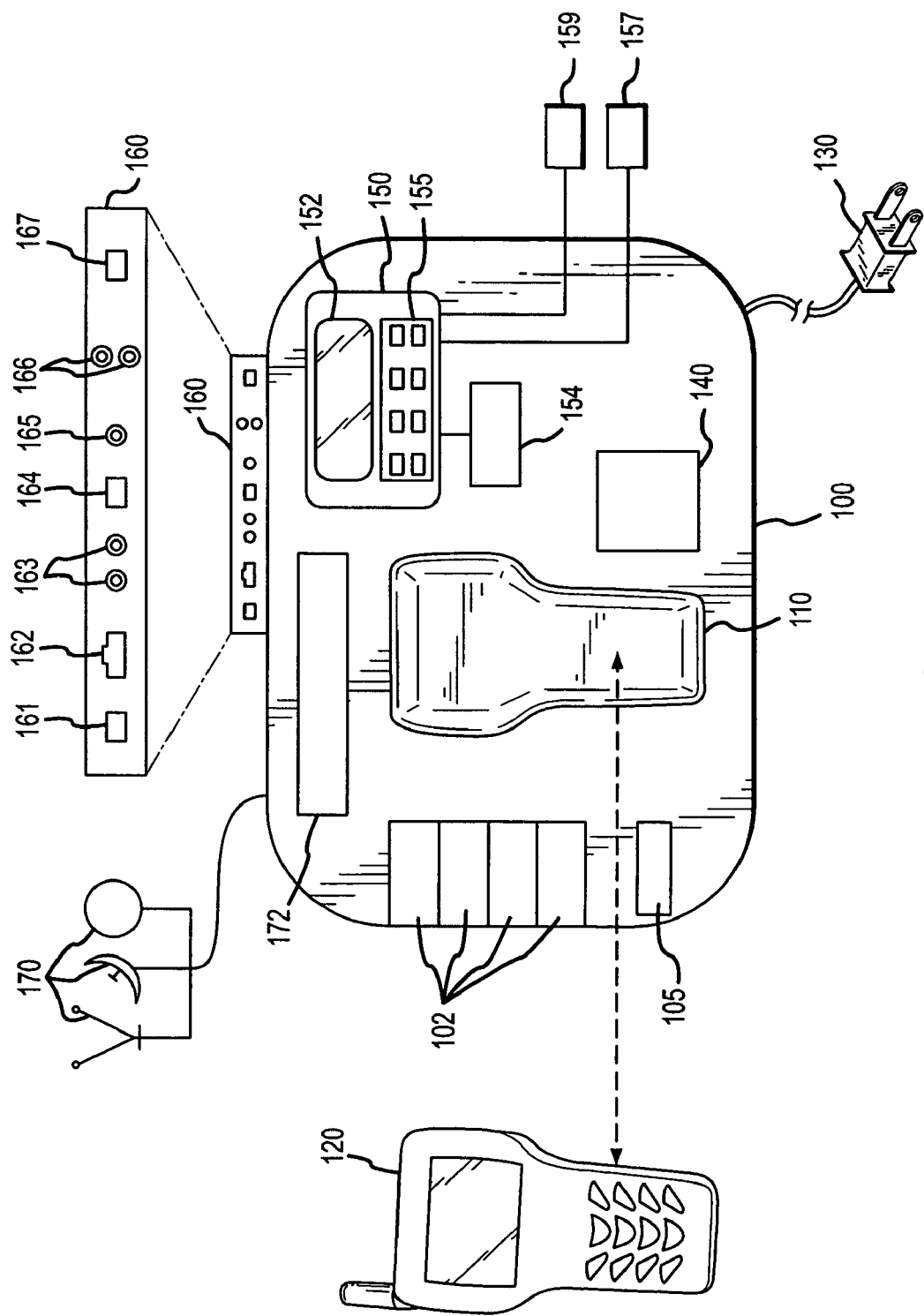
FIG. 1 illustrates a wireless phone with media capabilities and a base station, in accordance with various embodiments of the invention.

FIG. 1 illustrates a wireless phone with media capabilities and a base station, in accordance with various embodiments of the invention. The base station 100 may interface with a portable media device 120, as described in more detail below. In some embodiments of the present invention, the portable media device 120 may be a wireless phone having media capabilities and/or functions, examples of such devices include the wireless phones described in detail in co-pending U.S. application Ser. Nos. 11/060,224 and 11/434,729. The portable media device 120 may also be an MP3 player or the like.

In some embodiments of the present invention, the base station 100 may be modular in design and may include all of or any combination of the features illustrated in the figures and/or described below. The modular design of some embodiments of the present invention, may allow for a manufacturer and/or a consumer to customize the features of the base station 100. In aspects of the present invention, customization of the modular features may be performed for cost, convenience or other reasons.

In some embodiments, the base station 100 may have expansion slots 102 where modules may be added to the base station 100. Such modules may include upgrade modules, content storage modules and/or content acquisition modules, or the like. The expansion slots 102 may be used to add features such as future memory card interfaces, hard drive content, interactive television applications, additional content storage, additional input/output ports, and/or the like, to the base station 100.

In certain embodiment of the present invention, software interfaces 105 may be provided that may allow for updating/altering software running on the base station 100. The software interfaces 105 may include receptacles for mobile software cards. Mobile software cards generally are "Plug 'n Play" type devices allowing a user to simply put the mobile software card in the software interface 105 and immediately begin using the game or application stored on the mobile software card. By storing an application on the mobile software card, memory and/or hard-drive space associated with the base unit 100 may be preserved. The software interfaces 105 may also be used with a suitable connection to synchronize the base station 100 with a computer or similar device to allow for, among other things, data exchange between the base station 100 and the computer, management of the functionality of the base station by the computer, and/or the uploading/down-loading of software from the computer to the base station 100.

In certain embodiments of the present invention, the base station 100 may include a docking port 110 through which the portable media device 120 and the base station 100 can communicate. The communication connection between the portable media device 120 and the base station 100 may be a hard type connection, such as a cable, hot shoe, a male-female connector or the like. Standard interfaces (USB, 1394, etc.) and/or proprietary interfaces may be used. In different aspects or embodiments, communication between the base station 100 and the portable media device 120 may be by wireless connection—such as a WiFi connection, Bluetooth connection, infrared connection, and/or the like—or it may be a combination of a hard connection and a wireless connection.

In certain aspects of the present invention, the base station 100 may be connected to a power source 130. The power source 130 may be a connection to an electrical outlet or the like, or it may be a mobile power supply, such as a battery or the like. In some aspects of the present invention, the base station 100 may contain a power port 140 for supplying power to the portable media device 120. The power port 140 may provide power to the wireless phone with media capabilities via a hard type connection, hot shoe, male-female connector, or the like. Powering interfaces for such devices are known in the art and need not be described further.

In certain embodiments of the present invention, the base station 100 may include a user interface 150 providing for a user of the base station 100 to interface with the base station 100. In certain aspects of the present invention, the user interface 150 may have a display 152. The display 152 may be a liquid crystal display, a touch screen, or the like. The user interface 150 may also include a control panel 155. Control panel 155 may be a keyboard or other data entry type interface and may be connected to the base station 100 or may interface with the base station 100 wirelessly. In aspects of the present invention, the user interface 150 may be built into the base station 100. For ease of use, among other reasons, the user interface 150 may be either wholly or partially removable from the base station 100, for example it may be connected to the base station 100 by flexible communication means, such as a wire harness, or the like. In further aspects, using wireless communication, the user interface 150 may be fully removable from the base station 100. In aspects of the present invention, user interface 150 and/or control panel 155 may communicate with the base station 100 using Bluetooth technology, or the like. It should be noted that in some embodiments, a user can interact with the base station 100 through other means, e.g., via a web browser, dedicated computer connection etc. In such embodiments, the base station 100 need not include a hardware user interface 150.

In certain aspects of the present invention, the user interface 150 and/or the base station 100 may contain a network port 157 through which the user interface 150 and/or the base station 100 may connect to a Local Area Network (LAN), Wide Area Network (WAN), or the Internet. The network port 157 may be an RJ 45 jack configured for Ethernet communication. In some aspects, the user interface 150 may support a browser or browsers in the user interface 150 and may provide a user with the ability to browse a network connected through the network port 157. Using the user interface 150 with a browser, a user may browse the Internet to identify media content and media sources. In further aspects, a user may use a personal computer to access the user interface 150 via a computer network and the network port 157. Merely by way of example, the base station 100 may include a web server configured to interface with a standard web browser, allowing a user to interface with the base station 100 and/or the portable media device 120 via such a browser. Alternatively or in addition, the base station 100 may include a dedicated software application accessible from a computer in communication with the base station 100.

In certain embodiments of the present invention, a user interface communication port 159 may be used to synchronize the user interface 150 with other devices, including portable media device 120, a personal computer, or the like. By synchronizing a device with the user interface 150, a user may use an external device to control the base station 100 and/or media device 120, exchange data with the base station 100 and/or media device 120, download/upload software to the base station 100 and/or media device 120, or the like.

In some embodiments of the present invention, the base station 100 may be equipped with one or more receiver and/or antennas 170. In certain aspects of the present invention, the antennas 170 may be utilized to receive broadcast media content. Antennas 170 are only exemplary and may be of any appropriate composition that is designed to receive very high frequency ("VHF") signals, ultra high frequency ("UHF") signals, amplitude modulated ("AM") signals, frequency modulated ("FM") signals, high definition ("HD") signals, and the like. Alternatively and/or in addition, the base station 100 may be in communication with another device, such as a set-top box, network interface device, etc., which may be configured to receive media content and/or transfer such content to the base station 100.

In some embodiments of the present invention, therefore, the base station 100 may include a plurality of communications ports 160 for coupling the base station 100 to incoming media and/or to various other devices capable of delivering media content to the base station 100. Exemplary communications ports include a network port 161, a phone/modem port 162, a set of RCA-type or composite ports 163, S-video ports 164, an optical port 165, and a pair of radio-frequency (RF) ports 166. The ports just mentioned and illustrated in FIG. 1 are not meant to be limiting in nature. Instead, the communications ports listed are illustrative of the various media ports that may be included on the base station 100.

A variety of other communications ports may also be included on the base station 100. For example, a phonograph port, another audio/visual port, a dedicated audio port, a visual port, an additional S-video port, a monitor port, a component video port, an optical port, a coaxial port, a coaxial digital port, a multichannel port, a speaker port, a universal serial bus (USB) port, an IEEE 1394 port, audio ports, stereo ports an RS-232 serial port, a parallel port, a serial port, and/or the like, may all be included on the base station 100. For convenience, these ports are not each individually illustrated in FIG. 1, but instead are denoted as a generic port 167. Consequently, the drawings and figures, and included disclosure should not be interpreted as limiting the invention to only the ports illustrated in FIG. 1. The ports illustrated in FIG. 1 may be both input and output ports and/or may provide means for the base station 100 to exchange data with, to receive media content from and/or communicate with external media devices and sources. Such ports may use hardware, software, etc., that is standardized and/or widely available.

In some embodiments of the present invention, the communication ports 160 allow for the communication of the base station 100 with media devices, media content providers and the like. In certain aspects of the present invention, communication ports 160 may be used for communication with media devices—such as minidisc players/recorders, compact disc players/recorders, DVD players/recorders, video cassette players/recorders, cassette players/recorders, camcorders, televisions, or the like—to provide for the communication of media content from the devices to the base station 100. Similarly, in certain aspects, the base station 100 may receive through the communication ports 160 media content from content providers. In some aspects of the present invention, media content may be received at the base station 100 from a content provider via an external device—such as a television, radio, or the like—or may arrive via a network, such as the Internet.

As well as media content, in different embodiments, information regarding available and/or delivered media content—such as programming schedules, play lists, program content, and/or the like—may be delivered to the base station 100 via the communication ports 160. In various embodiments of the present invention, a processor 154 in the base station 100 may query media provider sources for content available to the base station 100 and display results to a user of the base station. In other embodiments, content providers—such as satellite television, Internet broadcasters, wireless/cellular network providers, a third-party associated with such persons, or the like—may transmit and or update available media content. In further embodiments, a party associated with the base station 100 may transmit lists of media content available to the base station 100 to the base station 100 for display on the user interface 150. Merely by way of example, a wireless provider associated with the base station may transmit information concerning media content available to the base station 100 to the base station 100. In some embodiments of the present invention, such a transmission may include information regarding how to download the media content to the base station 100. In other aspects, devices in communication with the base station 100 may provide details of available or delivered media content to the base station 100. Media content available to and/or stored on the base station 100 may be displayed on the display 152 of the user interface 150.

Figure 2:
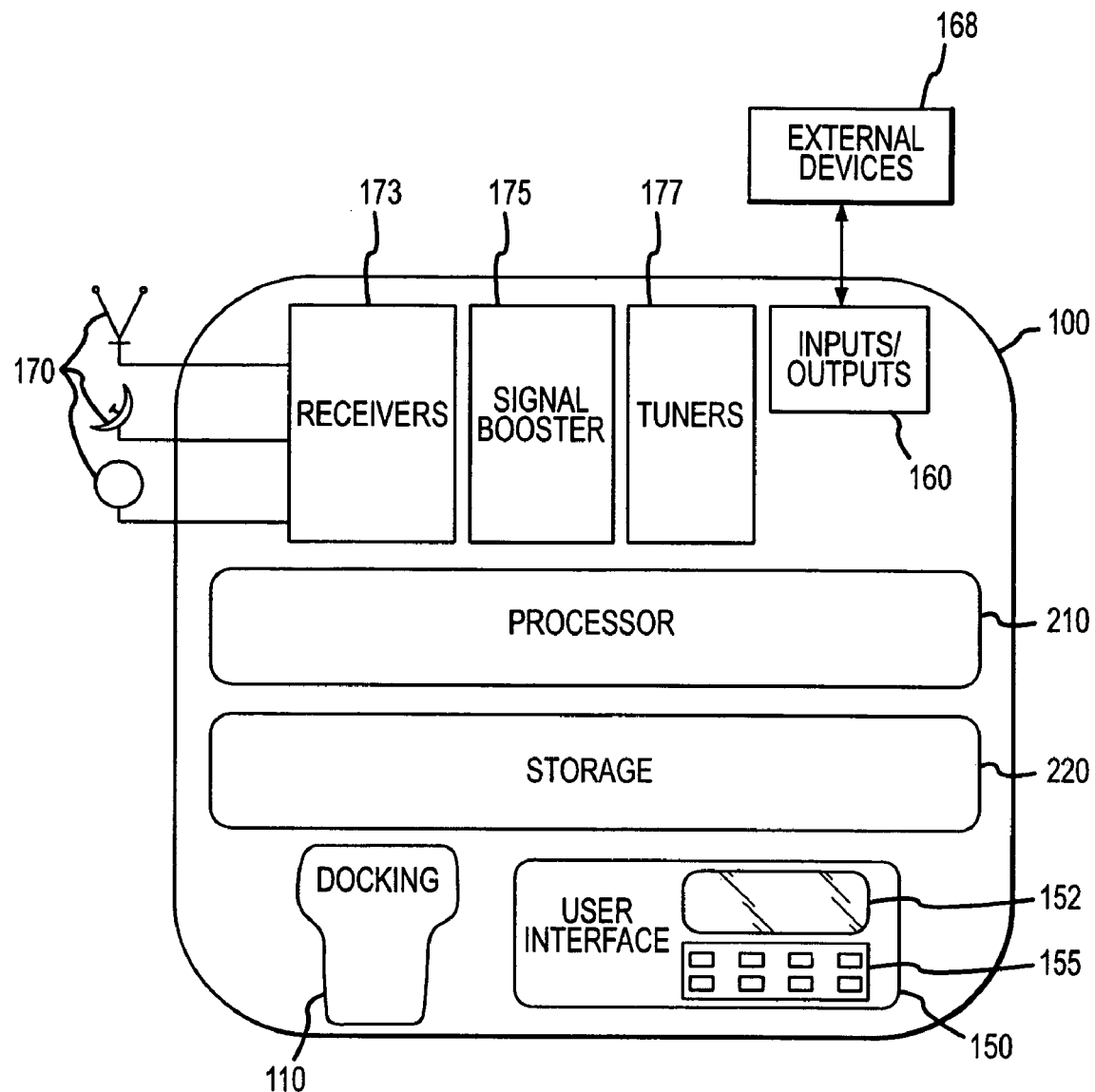
FIG. 2 illustrates a simplified functional diagram of a base station, in accordance with various embodiments of the invention.

FIG. 2 illustrates a simplified functional diagram of a base station, in accordance with various embodiments of the invention. In some embodiments of the present invention, media content may be delivered to the base station 100 via a receiver 173 and/or the inputs/outputs 160. In aspects of the present invention, the receiver 173 may include any receiver capable of receiving media content, including the antennas and satellite dishes 170, and the like. In certain aspects of the present invention, the receiver 173 is connected to a signal booster 175. The signal booster 175 may be a device designed to increase the antennas and satellite dishes 170 signal reception capabilities, may be amplifiers that amplify the signal received by the antennas and satellite dishes 170, or a combination of both of the aforementioned signal boost systems.

As described above, the base station 100 may have media content inputs other than the receiver 170. In certain aspects, the base station 100 may have a cable input in the inputs/outputs 160 for receiving media content over a cable connection. In other aspects, the base station 100 may have a network input in the inputs/outputs 160 for receiving media content over a network connection. In further aspects, the base station 100 may have a receiver and/or input for receiving video content from a wireless and/or cellular network. In some embodiments, the network input may be a modem connection—such as a DSL or dial up connection, or the like—or an Ethernet connection, WiFi connection, etc. In certain embodiment, the present invention may include a plurality of video inputs and audio inputs in the inputs/outputs 160. The inputs/outputs 160 may provide means for a user to connect devices to the base station 100 and transfer media content to the base station 100. Devices that may be connected to the base station 100 via the inputs/outputs 160 may include televisions, video recorders, digital cameras, video cameras, sound recorders, DVD players, CD players, computers, MP3 players, radios, and the like. In fact, some embodiments of the present invention are intended to provide connections to the base station 100 for virtually all types of available media content storage devices, media content generating devices and media content receiving devices, to provide a user with a base station 100 that is universally able to receive media content from the user's other media devices. Such connections may be digital, analogue, etc as appropriate.

In certain embodiments of the present invention, the base station 100 may have an associated receiver/input processor 172 that may be operable to manage the reception of media content. The receiver/input processor 172 may be a processor, software application, or the like associated with the base station 100. In some embodiments, the receiver/input processor 172 may monitor signal strength of the received media content. In certain aspects, the receiver/input processor 172 may cause an alert to be provided to a user of the base station 100 if the signal strength of the media content falls below a threshold value. In some embodiments, the receiver/input processor 172 may select the source from which to receive media content. In some embodiments the receiver/input processor 172 may select the receiver and/or input through which to receive the media content. In certain embodiments, the receiver/input processor 172 may process information concerning media content available to the base station 100. Merely by way of example, such processing may include listing the media content in logical lists. In some aspects, the receiver/input processor 172 may be operable to receive information concerning media content available to the base station 100 transmitted by a media content provider, by a party associated with the base station 100, by a third party, and/or the like.

In certain embodiments of the present invention, the tuner 177 may consist of both video and/or audio tuners that may be used to tune the media content entering the base station 100 either via the antennas or satellite dishes 170 and/or the inputs/outputs 160. Media content received/input into the base station may be either analogue or digital. In aspects of the present invention, the tuner 177 may be an analogue tuner, a digital tuner, or a combination of both. In some aspects, in the case of video media content, the tuner 177 may be designed for e National Television Standards Committee (NTSC), PAL broadcast, SECAM, Digital Satellite System (DSS), Digital Broadcast Services (DBS), Advanced Television Standards Committee ("ATSC"), high-definition ("HD") signals, a combination of these signals, or the like. In some embodiments, the use of multiple tuners provides the base station 100 with the ability to receive media content from multiple sources at the same time. In an aspect of the present invention, the tuner 177 may convert the input signals into an appropriate form for processing. As persons skilled in the art are aware, audio and video signals from some sources, including, but not limited to, external devices and the Internet, may not require tuning.

In certain embodiments of the present invention, signals from the tuner 177 may be processed by a processor 210. Processing may involve digitizing, decoding and/or formatting of the signals. In some embodiments of the present invention, the processor 210 digitizes signals received from the tuners 177. For digitizing purposes, the processor 210 may provide for digital to digital conversion of the signal, digital to analogue to digital conversion of the signal, and/or analogue to digital conversion of the signals. In some aspects, where media content is received from a computer network, such as the Internet, or is already in digital form, digitizing by the processor 210 may not be necessary.

In some aspects of the present invention, the processor 210 may include a decoder to decode the signals received from the tuner 177. With respect to video signals, the processor 210 may decode the signal for presentation on a video screen and may produce any suitable format including standard formats such as 1280×768, 640×480, 720×480, or 720×576 pixels. In certain embodiments of the present invention, the video content received by the base station 100 may be intended for use on a small display screen on portable media device 120 and the processor 210 may include a screen formatter to scale the video content for display on the display screen of portable media device 120. In certain aspects of the present invention, the screen formatter may scale the video content for display on the quarter common intermediate format ("QCIF"), which is 176×144 pixels. In alternative embodiments, the screen formatter 160 may scale the video content for display on the quarter video graphics array ("QVGA"), which is 320×240 pixels. Formatting of the video content prior to storage on the base station 100 or portable media device 120 may provide for a reduction in necessary storage space associated with the base station 100.

In some embodiments of the present invention, the media content input into the base station 100 is communicated to portable media device 120. Communication may occur when portable media device 120 is docked with the base station 100. In some embodiments, the content communicated to portable media device 120 may be stored on portable media device 120.

In other embodiments, the base station 100 contains storage 220 for storing media content. In an aspect of the present invention, storage 220 may be a hard drive, flash memory, or the like, onto which media is stored. In an alternative aspect, storage 220 may be provided by recording the media onto a media card. Media cards used for media storage may include a memory stick (MS), media card, secure digital ("SD"), xD-picture card, or the like. In various embodiments of the present invention, media stored in storage 220, whether stored on a hard drive, on a media card or other storage system, may be transferred to portable media device 120 when portable media device 120 is docked with the docking port 110 and/or in communication with the base station 100. In different embodiments, communication of media content from the base station 100 to portable media device 120 may be via a hard connection, wireless connection or other communication means. In further embodiments, transfer of media content from the base station 100 to portable media device 120 may be effectuated by transferring a media card or other transferable media storage device from storage 120 to a playback port on portable media device 120.

Figure 3:
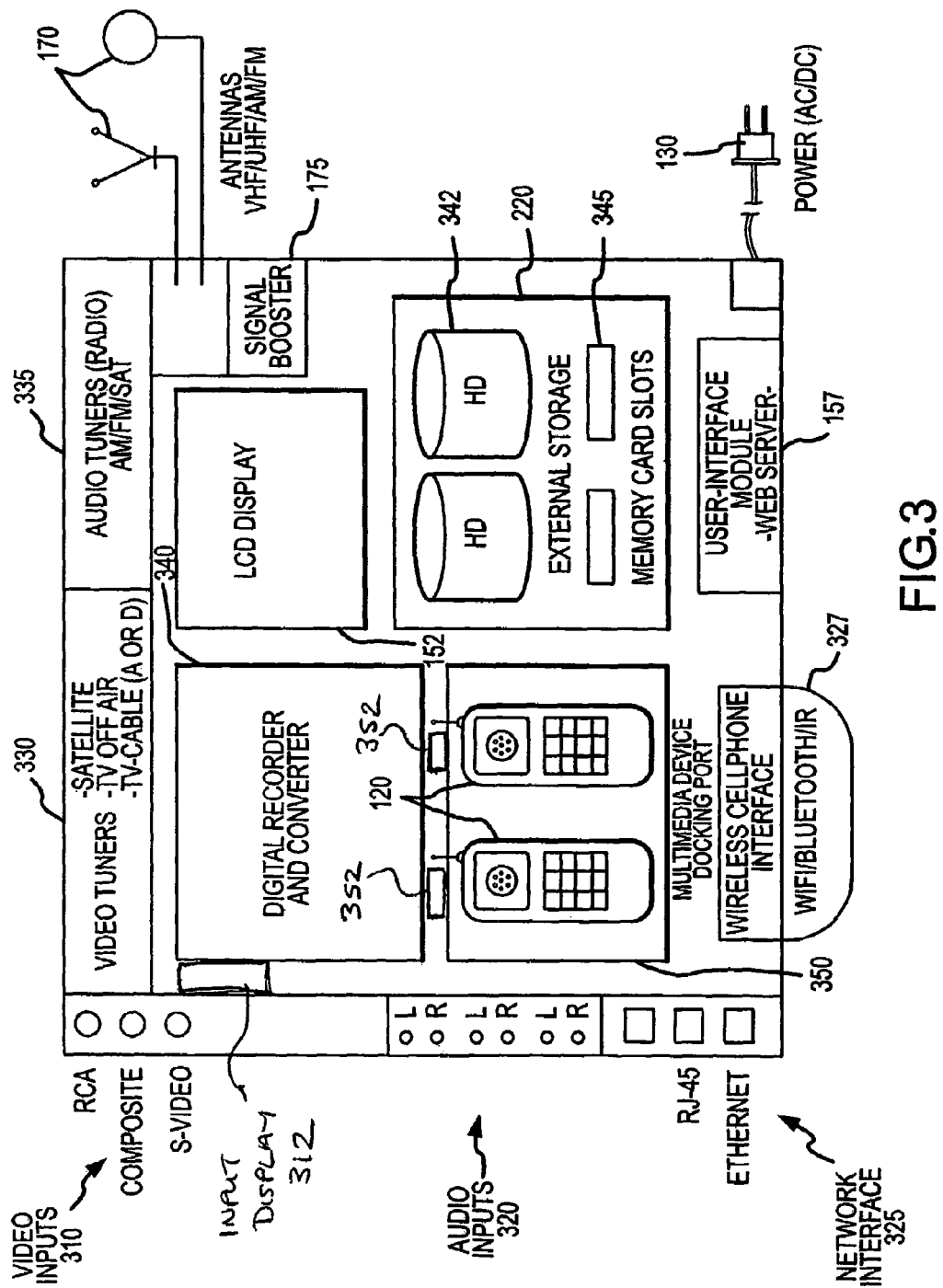
FIG. 3 illustrates a block diagram of a base station, in accordance with various embodiments of the invention.

FIG. 3 illustrates a block diagram of a base station, in accordance with various embodiments of the invention. FIG. 3 illustrates how, according to some embodiments of the present invention, the base station 100 may have a modular design allowing for fabrication of base stations with different features. In some embodiments, similar components are grouped together allowing for the modular design. In further embodiments, components may be contained in modules that may be added to or removed from the base station 100.

In certain embodiments, the base station 100 may include inputs for receiving media content. In some embodiments of the present invention, the base station 100 is configured to receive media content from antennas and satellite dishes 170. The antennas and satellite dishes 170 may receive VHF, UHF, HD, AM, FM, and satellite signals containing media content, or the like. In some aspects, antennas and satellite dishes 170 may be incorporated into the base station 100. The signals received by the antennas and satellite dishes 170 may be boosted by signal booster 175. In some embodiments, audio tuners 335 are used to tune audio media received by the antennas 170 or a satellite dish. In certain aspects, video tuners may be used to tune video media received by the antennas and satellite dishes 170. Certain embodiments of the present invention may have video inputs and audio inputs allowing for connections to media devices to provide for the inputting of media from portable media devices to the base station 100. In this way, embodiments of the present invention may provide the user of the base station 100 with a single device with which he or she can centrally load media from media devices and/or media providers for use in portable media device 120, which may be a wireless phone with media capabilities.

In certain aspects of the present invention, the base station 100 may also have a network interface 325 to prove means for downloading media content from a network, including the Internet, to the base station 100. Network interface 325 may be a modem, an RJ45 jack, an Ethernet connection, a WiFi connection, or the like. Network media content received via the network interface 325 may include streaming video, Internet Protocol broadcasts and the like. In certain aspects, the base station 10 may be capable of interfacing with an on-demand media-content provider. In certain aspects, a user of the base station 100 may subscribe to the on-demand provider to gain access to the media content available from the on-demand provider. In other aspects, the user may make payments to the on-demand media-content provider when selecting to download media content to the base station 100.

In some embodiments of the present invention, media content from any or all of the various inputs, receivers and/or network connections of the base station 100 may be communicated to the digital recorder and converter 340. In certain aspects, the digital recorder and converter 340 may convert media content for ease of storage. Such conversion may include compression of the media content including converting audio and video media to MPEG format or other media compression formats. After conversion, the digital recorder and converter 340 may record the media content to storage 220. In some aspects of the present invention, media content may be stored to one or more hard drives 342 on the base station 100. In different embodiments, flash memory may be used instead of the hard drives 342. In other aspects, media content may be written to and stored on memory cards located in memory card slots 345. In certain aspects, the base station 100 may have one or more memory card slots 345 into which memory cards may be positioned.

In some embodiments, the base station 100 may contain a media docking port 350 for docking the one or more media devices 120 with the base station 100. In certain embodiments, a plurality of such devices may be supported. In a particular set of embodiments such devices may include one or more wireless phones each of which may have a variety of media capabilities. In certain embodiment of the present invention, the docked media device 120 and the base station 100 may communicate with one another through the docking port 350. According to some embodiments of the present invention, when connected to the docking port 350, portable media device 120 may be charged and/or receive media content from the base station 100. Media content received from the base station 100 by portable media device 120 may be played back on portable media device 120 as desired by a user of portable media device 120. According to some embodiments, the base station 100 may also be equipped with wireless phone interfaces—such as WiFi, Bluetooth, an infra red port, or the like—to provide means for portable media device 120 to communicate with the base station 100 when media device 120 is not connected to the base station 100 via the docking port 350. In such embodiments, media content may be passed from the base station 100 to portable media device 120 wirelessly.

In some embodiments of the present invention, a status display 312 may be provided to display the status of portable media device 120 currently docked to the base station 100. Merely by way of example, the status display 312 may comprise two light emitting diodes ("LED") for each docking station, a green LED and a red LED. In such an example, the red LED may be illuminated to show when portable media device 120 docked with the base station 100 is receiving data from the base station 100, and the free LED may be illuminated when portable media device 120 is not receiving data from the base station 100 and may be removed from communication with the base station 100. In various embodiments, LCD display 152 may display, among other things, media content stored on the base station 100, recording status, status regarding a transfer of media content from the base station 100 to portable media device 120, available storage on the base station 100, available storage on a memory card, available storage on a media device 120, inputs and/or receivers in use for receiving media content, inputs and/or receivers available for inputting and/or receiving media content, sources of media content from which media is being received, base station hard-drive status, and the like.

In certain embodiments of the present invention, a user of the base station 100 may interface with the base station 100 (e.g., via a user interface module 157, for example, as described above). In alternative aspects, the user may use portable media device 120 as means to interface with the base station 100. In some aspects, portable media device 120 may be used as means to provide the user remote access to the base station 100 via portable media device interfaces 327. According to certain embodiments of the present invention, synchronization between portable media device 120 and the user interface communication port 159 may be provided to allow the user to access all of the features and functions of the user interface module 157 from portable media device 120.

In some embodiments of the present invention, user interface module 157 may be connected to a web server and may contain one or more browsers allowing a user to access and receive web based information. Accordingly, the user may use the user interface module 157 to search the web for available media content and/or may receive information from the web via the user interface module 157. In certain embodiments of the present invention, the user may utilize the user interface module 157 to enter rules regarding the reception, recording and/or storage of media content by the base unit 100. In certain aspects, several users may use the same base station 100. In some aspects, each user of the base station may enter their own rules into the base station and may associate a password and/or identifier with their own rules. In various aspects of the present invention, when a user's portable media device is docked with the portable base station the user may enter their password and/or identifier to provide for the application of the user's rules by the base station. In other embodiments, the user may use an additional interface such as a computer or the like, to interface with the user interface module 157 and enter data, including media content retrieval and storage desirability. As noted above, a content processor in the base unit 100 may identify media content available to the base unit for recording and storage without further input from the user.

According to some aspects of the present invention, a LCD display 152 may provide means to display to a user of the base station 100 functions and/or capabilities of the base unit 100. In some embodiments of the present invention, the LCD display 152 may be a touch screen type device allowing the user to select desired functions and/or capabilities by touching the appropriate area of the touch screen. In certain aspects, the LCD display 152 may display information regarding the media content selected to be recorded in an upcoming time period, the media content stored in the storage 220, the content sources available to the base station 100, signal strength available from media content source available to the base station 100, the state of charge of a battery for media device 120, rules for media content recording and storage currently being used by the base station 100, and/or the like.

In some embodiments, the user interface module 157 may contain a processor for managing the reception and storage of media content by the base station 100. As described above, in some aspects, selection and storage of media content is made according to rules entered by a user. In some embodiments, the processor may be provided with or query the availability of media content. In certain aspects, availability of media content may be provided to the processor by media content providers, such as cable or satellite providers. In other aspects, the processor may obtain media content availability from the Internet. In some aspects, the processor may receive media content availability from Internet sites associated with media content providers or reporting media content availability. In other aspects, a third party may maintain an Internet site/web page containing information regarding media content availability. In further embodiments of the present invention, a wireless phone provider may transmit information regarding the availability of media content to the base station 100.

Figure 4:
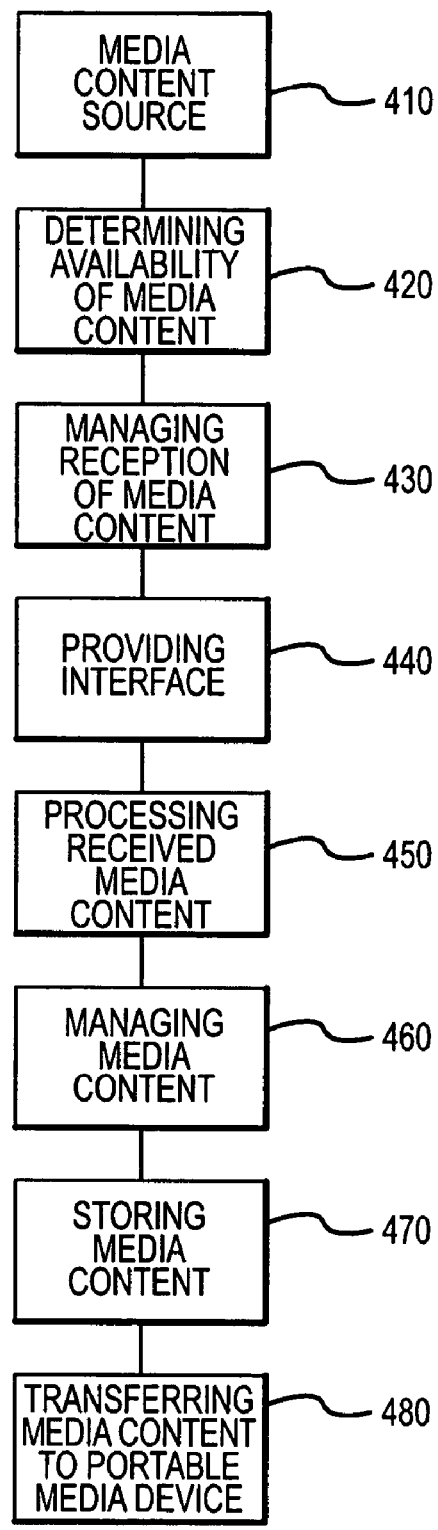
FIG. 4 depicts a simplified flow type diagram of the reception and transfer of media content by a base station, in accordance with various embodiments of the invention.

FIG. 4 depicts a simplified flow type diagram of the reception and transfer of media content by a base station, in accordance with various embodiments of the invention. Embodiments of the present invention may include some or all of the steps described below. Media content sources 410 may be an over-the-air broadcaster of video content, a web-based broadcaster of video content, a satellite broadcaster of media content, a cable provider, or the like. While there are numerous sources of media content and media content is generally available at all times of day or night from numerous media sources, a problem for many mobile wireless media devices is that they may have only limited abilities to receive media content available from the media content source 410. Limitations in the receiving capability of mobile media devices may be due to the inherent design of a portable media device, such as limited receiving capabilities of receivers on the portable media device including antennas, WiFi receivers, and the like. Additionally, such devices may not have the necessary power for signal boosting and/or receiving and storing large amounts of media content. Further, the mobile nature of such devices often means that their reception is transient and/or dependent on the location of the device. In contrast, the base station 100 may be equipped with multiple and/or larger scale receivers, multiple inputs for receiving media content form other media devices, a power source and receiver boosters.

As illustrated in FIG. 4, in step 420 a determination may be made as to the availability of media content. In some embodiments, a media source may send a content guide to the base station. Alternatively and/or in combination, a party associated with the base station 100 or a third party may transmit a guide of available media content to the base station 100. In some embodiments of the present invention, availability of media may be determined from the Internet and/or web pages containing media content information.

In step 430, reception of media content may be managed. Management of the reception content may be actuated by a processor and/or a software application associated with the base station 100. In some embodiments of the present invention, media content available to the base station 100 may be displayed to the user on the display screen 152. In some embodiments, the user may select video content to be received and/or stored by the base station 100. In other embodiments, the user may enter rules into the base station 100 providing the base station 100 with information regarding the video content the user would like the base station 100 to receive and/or store. Merely by way of example, a user may set the base station 100 to receive and/or store programming available to the base station 100 concerning defined subject matter, such as a type of sport. In further embodiments, the base station 100 and/or a processor and/or a software application associated with the base station 100 may select media content for receiving by and/or storage on the base station 100 based upon habits of the user. Merely by way of example, media content may be selected for receiving and/or storing on the base station 100 based upon a user's prior use of the base station, e.g., prior recordings, prior receptions, etc. In some embodiments, the base station may create a profile for the user and may make selections of media content for receiving/storing based upon the profile. Merely by way of example, if the user has previously received/stored basketball games, the base station 100 may select available basketball games for receiving/storing.

Managing the reception of media content may also involve determining the correct reception interface for the selected media content. In step 440, a receiving interface is provided for reception of the media content by the base station 100. As discussed above in more detail, the base station 100 may be equipped with one or many different types of interfaces for receiving media content. In some embodiments of the present invention, the user may select the interface for receiving the desired media content at the base station. Merely by way of example, the user may select to receive a broadcast television signal via an attached aerial. In certain embodiments, the base station 100 may suggest or may select the interface for receiving the desired media content. In some embodiments of the present invention, the media content may be available to the base station from different sources and the base station 100 may select the appropriate receiving interface with which to receive the media content. Merely by way of example, the base station 100 may have a ranking of receiving interfaces based upon quality factors, such as signal strength, high definition capabilities, etc. As discussed above, the base station may provide for the reception of enhanced signal strength media in comparison to portable media device. Further, in some embodiments of the present invention, the base station 100 may be provided with two or more receiving interfaces and, where necessary two or more tuners, to provide for simultaneous and/or overlapping reception of different media content.

Processing 450 of the inputted media content may provide for digitizing, formatting and/or compression of the media content. In some embodiments, video content may be formatted for display on a smaller sized screen used on a portable media device. In certain embodiments, the media content may be compressed to reduce associated storage requirements. In step 460 managing of the media content received by the base station 100 may occur. Management may be performed by a processor, software application, etc. associated with the base station 100. In some embodiments, media content to be stored may be associated with a deletion date, etc. In certain embodiments, the media content selected for storage may be associated with a priority value. In certain aspects, the user may associate a priority value to the media content. In other aspects, the processor, software, etc may associate a priority value to the media content. In some embodiments of the present invention, the priority value may indicate the value of the media content to the user. In certain embodiments, decisions regarding storage of media content—e.g., duration of storage, deletion when storage limits are at issue—may be made based upon the priority value associated with the media content. Merely by way of example, when storage associated with the base station is limited, media content with a low priority value may be erased to provide room for video content with a higher priority value. Similarly, video content with a high priority value may be stored for a longer duration of time.

In step 470 the media content received by the base station may be stored. In some embodiments, media content may be stored on a hard-drive, flash memory, etc., associated with the base station 100. In certain embodiments, the base station 100 may have a read/write port for writing the media content to a memory card. In certain aspects, modular memory may be added to the base station to increase the memory characteristics of the base station 100.

In step 480 media content received and/or stored on the base station 100 may be transferred to the media device 120. In some embodiments of the present invention, the media device 120 may be docked to the base station 100 and the processed media content may be transferred 440 from the mobile station to the wireless phone with media capabilities 120. In some embodiments, transfer of the media content from the base station 100 to the wireless phone with media capabilities 120 may be via a hard connection or a wireless connection. As persons familiar with the art are aware, transfer of media content may be made via a Firewire connection, or the like. Transferring of media content from the base station 100 to the media device 120 may be done in real-time, e.g., as the media content is received by the base station 100 it is transferred to the media device 120. Alternatively or in combination, the media content may be stored on the media device 100 or an associated storage device, such as a memory card, and subsequently transferred to the media device 120.

By transferring the media content to a docked media device the capabilities of the base station as an enhanced receiver of media content are utilized. Further, by providing the base station with multiple inputs the disclosed method may provide a user with a single source of connectivity to different media devices—such as DVD players/recorders, televisions, radios, MP3 players/recorders, computers and the like. Additionally, the base station may provide for a permanent and or semi-permanent connection to be established between the base station 100 and the media content source 410 that need not be established every time a user wants to download media from the media content source to portable media device 120. In some embodiments of the present invention, digitized and formatted media content is transferred to the media device 120 and is then stored on the media device 120. In certain embodiments, the media content is stored on a memory card that may then be played on the media device.

In some embodiments, transferring 480 of media content may be controlled by a user of the base station 100. In other embodiments, transferring 480 may be controlled by the base station or a transfer processor associated with the base station. In some aspects, the transfer processor may be a computer associated with the base station 100. In certain aspects, when the transferring 480 of media content is performed by the base station or a transfer processor associated with the base station, transferring 440 may be managed according to certain parameters, such as storage space available on the wireless phone with media capabilities 120, desirability of the media content stored on the base station 100, and the like. In certain aspects, the user of the base station may establish parameters for transfer. In some embodiments, audible and visual alerts may be provided to a user to show among other things, lack of storage space on portable media device 120, lack of adequate connection between the base station 100 and portable media device 120, low power capabilities associated with portable media device 120, and/or the like. In certain embodiments of the present invention a processor may control the transfer of media content between the base station 100 and the portable media device 120. In certain aspects, the transfer processor may determine the size of the media data being transferred prior to transfer and compare this value with the actual media transferred from the base station 100 to the portable media device 120 as a checksum. In certain aspects, the transfer processor may monitor the transfer of media data, identify a location in the media content when transfer of the media content is interrupted and continue transferring the media content from this location when communication between the base station 100 and the portable media device 120 is restored. In some embodiments, the user interface 150 on the base station 100 may display media content stored on the base station 100. In certain aspects, the user may use controls to select and manipulate the status of media content stored on the base station 100. In further embodiments, the user interface 150 may display transfer methods available for transferring media content from the base station 100 to the wireless phone with media capabilities 120.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims. Although specific embodiments of the invention have been described, various modifications, alterations, alternative constructions, and equivalents are also encompassed within the scope of the invention. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof. For example, the processing performed by the present invention, as described above, may be implemented in hardware chips, graphics boards or accelerators, etc.

What is claimed is:

1. A manager for a portable media device base station, comprising:
    a base station operable to receive broadcast media content of one or more selected media types;
    a reception processor in communication with the base station and configured to manage reception of the broadcast media content;
    a power supply operable to provide power to the base station; and
    a docking port in communication with at least one of the base station, the reception processor, or the power supply and configured to dock a handheld media device with the base station, wherein the handheld media device is operable to support at least one of the selected media types.

2. The system of claim 1, further comprising:
a storage processor associated with the base station and configured to control storage of the broadcast media content.

3. The system of claim 2, further comprising a media transferor, in operative communication with the storage processor and the docking port, and configured to communicate media information from the storage processor to the handheld media device.

4. The system of claim 2, further comprising a media transferor, in operative communication with the storage processor and the docking port, and configured to communicate media information to the storage processor from the handheld media device.

5. The system of claim 1, wherein:
the reception processor monitors a signal strength associated with the broadcast media content.

6. The system of claim 5, wherein:
the reception processor is configured to provide an alert when the signal strength falls below a threshold value.

7. The system of claim 1, wherein:
the reception processor is operable to select a receiving device from a plurality of receiving devices associated with the base station for receiving the broadcast media content.

8. The system of claim 1, further comprising:
a receiver associated with the reception processor and operable to receive information concerning the broadcast media content available for reception by the base station.

9. The system of claim 8, wherein:
the reception processor is operable to configure the information for display on a display screen associated with the base station.

10. The system of claim 8, wherein:
the information is received from a wireless network provider associated with the base station.

11. The system of claim 8, wherein:
the information is transmitted to the receiver over at least one of a wireless network, a computer network, or an over-the-air network.

12. The system of claim 1, further comprising:
a browser associated with the reception processor and operable to browse a network.

13. The system of claim 12, wherein:
the reception processor is operable to connect to the network via the browser and identify broadcast media content available to the base station.

14. The system of claim 1, wherein:
the reception processor is operable to process rules provided to the reception processor.

15. The system of claim 14, wherein:
the rules are provided to the reception processor by a user of the base station.

16. The system of claim 14, wherein:
the user provides the rules to the reception processor through a computer configured to communicate with the reception processor.

17. The system of claim 14, wherein:
a first set of rules are provided to the reception processor by a first user of the base station;
the first user associates a first password with the first set of rules;
a second set of rules are provided to the reception processor by a second user of the base station; and
the second user associates a second password with the second set of rules.

18. The system of claim 14, wherein:
the reception processor selects the broadcast media content to be received by the base station based upon the rules.

19. The system of claim 14, wherein:
the reception processor selects the receiver to use to receive the broadcast media content based upon the rules.

20. The system of claim 14, wherein:
the reception processor selects a content source to receive the broadcast media content from based upon the rules.

21. The system of claim 1, wherein:
the reception processor is operable to process previous broadcast media content selected for reception by the base station and choose the broadcast media content to be received by the base station based upon properties associated with the previous selections.

22. The system of claim 1, wherein the power supply is further configured to provide power to the handheld media device through the docking port.

23. The system of claim 1, further comprising a media transferor, in operative communication with the reception processor and the docking port, and configured to communicate media information from the reception processor to the handheld media device.

24. The system of claim 1, further comprising a media transferor, in operative communication with the reception processor and the docking port, and configured to communicate media information to the reception processor from the handheld media device.

25. The system of claim 1, wherein the docking port is further configured to provide a physical connection between the base station and the handheld media device.

26. A manager for a mobile device base station, comprising:
a base station operable to receive and store broadcast media content;
a storage processor in communication with the base station and configured to manage storage of the broadcast media content; and
a docking port in communication with the storage processor and configured to dock a handheld media device with the base station, wherein the handheld media device is operable to support at least one of the selected media types.

27. The system of claim 26, further comprising:
a reception processor in communication with the mobile device base station for managing reception of the broadcast media content.

28. The system of claim 27, wherein:
the storage processor and the reception processor are incorporated within the base station.

29. The system of claim 27, further comprising a media transferor, in operative communication with the reception processor and the docking port, and configured to communicate media information from the reception processor to the handheld media device.

30. The system of claim 27, further comprising a media transferor, in operative communication with the reception processor and the docking port, and configured to communicate media information to the reception processor from the handheld media device.

31. The system of claim 26, further comprising:
a read/write device in communication with the base station, wherein the broadcast media content received by the station is written to a memory card by the read/write device.

32. The system of claim 26, wherein:
the storage processor selects broadcast media content to record based upon properties of previously recorded media content.

33. The system of claim 26, wherein:
the handheld media device comprises a wireless phone configured to play the broadcast media content.

34. The system of claim 26, wherein:
the docking port is configured to transfer media content from the base station to the portable media device.

35. The system of claim 26, wherein:
the storage processor is configured to synchronize the base station and the portable media device through the docking port.

36. The system of claim 35, wherein:
the storage processor synchronizes first media content stored on the base station with second media content stored on the portable media device.

37. The system of claim 35, wherein:
the storage processor synchronizes first rules entered by a user into the base station with second rules entered by a user into the portable media device.

38. The system of claim 26, wherein:
the storage processor is operable to process rules provided to the storage processor.

39. The system of claim 38, wherein:
the rules are provided to the storage processor by a user of the base station.

40. The system of claim 39, wherein:
the user provides the rules to the storage processor through a computer configured to communicate with the storage processor.

41. The system of claim 38, wherein:
a first set of rules are provided to the storage processor by a first user of the base station;
the first user associates a first password with the first set of rules;
a second set of rules are provided to the storage processor by a second user of the base station; and
the second user associates a second password with the second set of rules.

42. The system of claim 38, wherein:
the storage processor selects broadcast media content to record based upon the rules.

43. The system of claim 38, wherein:
the storage processor associates a first priority value to broadcast media content stored on the mobile device base station based upon the rules.

44. The system of claim 43, wherein:
the storage processor is configured to associate a second priority value to the broadcast media content received by the base station; and
the storage processor is configured to erase media content stored on the base station to provide storage space for the broadcast media content received by the base station when the second priority value is greater than the first priority value.

45. The system of claim 26, wherein:
storage processor associates a priority value with the broadcast media content stored on the base station based upon a prior recording history of the base station.

46. The system of claim 26, wherein:
the storage processor associates an expiration date with media content stored on the portable device base station.

47. The system of claim 46, wherein:
the expiration date is processed by the storage processor from rules entered into the base station by a user of the base station.

48. The system of claim 26, wherein:
the storage processor is configured to provide an alert when broadcast media content selected for storing exceeds available storage space.

49. The system of claim 26, further comprising a media transferor, in operative communication with the storage processor and the docking port, and configured to communicate media information from the storage processor to the handheld media device.

50. The system of claim 26, further comprising a media transferor, in operative communication with the storage processor and the docking port, and configured to communicate media information to the storage processor from the handheld media device.

51. A method for managing recording of broadcast media content by a mobile device base station, comprising:
identifying the broadcast media content available to the base station;
selecting broadcast media content;
receiving the selected broadcast media content at a reception processor; and
recording the selected broadcast media content on the mobile device base stations,
wherein the mobile device base station comprises a docking port configured to dock a handheld media device with the base station, and
wherein the handheld media device is operable to support at least one of the selected media types.

52. The method of claim 51, further comprising:
transferring at least a portion of the broadcast media content from the mobile device base station to the handheld media device.

53. The method of claim 51, wherein:
the handheld media device is a wireless phone configured to playback the broadcast media content.

54. The method of claim 51, wherein:
identifying the available broadcast media content comprises receiving a list of available broadcast media content from at least one of a service provider associated with the mobile device base station or a provider of the broadcast media content.

55. The method of claim 51, further comprising:
monitoring a signal strength associated with the broadcast media content.

56. The method of claim 55, further comprising:
providing an alert when the signal strength falls below a threshold value.

57. The method of claim 51, wherein:
a user of the mobile device base station selects the broadcast media content to be received by the mobile device base station.

58. The method of claim 51, wherein:
the selecting broadcast media content comprises selecting the broadcast media content based upon an analysis of previous media content received by the mobile device base station.

59. The method of claim 51, further comprising:
a user of the mobile device base station entering preferences into the mobile device base station.

60. The method of claim 59, wherein:
the broadcast media content is selected based upon the user's preferences.

61. The method of claim 51, wherein:

the broadcast media content is selected based upon a signal strength associated with the broadcast media content.

62. The method of claim 51, further comprising:

associating a first value with the selected broadcast media content;

associating a second value with media content stored on the mobile device base station; and deleting the stored media content when storage space available on the mobile device base station is less than that required to store the selected broadcast media content and the first value is higher than the second value, wherein the first and second values are processed from preferences of a user entered into the mobile device base station.

63. The method of claim 51, further comprising:

associating a priority value with the selected broadcast media content; and processing the priority value to determine whether to record the broadcast media content.

64. The method of claim 63, wherein:

the priority value is determined from preferences of a user, and the user preferences are entered by the user into the mobile device base station.

65. The method of claim 63, wherein:

the priority value is determined from an analysis of prior recordings made by a user of the mobile device base station.

66. The method of claim 63, wherein:

the priority value is determined from a signal strength associated with the broadcast media content.

67. The system of claim 51, further comprising transferring at least a portion of the selected media content to the base station from the handheld media device.

68. A method for managing recording of broadcast media content by a mobile device base station, comprising:

identifying the broadcast media content available to the mobile device base station;

selecting broadcast media content;

receiving the selected broadcast media content; and transferring the selected broadcast media content from the mobile device base station to a handheld media device, wherein the mobile device base station comprises a docking port configured to dock a handheld media device with the base station, and wherein the handheld media device is operable to support at least one of the selected media types.

* * * * *

UNITED STATES PATENT AND TRADEMARK OFFICE
CERTIFICATE OF CORRECTION

PATENT NO. : 7,377,440 B2 Page 1 of 1
APPLICATION NO. : 11/060633
DATED : May 27, 2008
INVENTOR(S) : Steven M. Casey It is certified that error appears in the above-identified patent and that said Letters Patent is hereby corrected as shown below:

At column 20, line 27, "stations" should be -- station --

Signed and Sealed this

Fifth Day of August, 2008

JON W. DUDAS
*Director of the United States Patent and Trademark Office*